US012051393B1

(12) United States Patent
Kuziakin et al.

(10) Patent No.: US 12,051,393 B1
(45) Date of Patent: Jul. 30, 2024

(54) REAL-TIME AUDIO TO DIGITAL MUSIC NOTE CONVERSION

(71) Applicant: MACDOUGAL STREET TECHNOLOGY, INC., New Paltz, NY (US)

(72) Inventors: Vasilii Kuziakin, Yerevan (AM); Ilia Belikov, Dilijan (AM); Aleksandr Alekseev, Erlangen (DE); Vazgen Hakobjanyan, Yerevan (AM); Robert Joseph Pfeifer, New Paltz, NY (US)

(73) Assignee: MacDougal Street Technology, Inc., New Paltz, NY (US)

( * ) Notice: Subject to any disclaimer, the term of this patent is extended or adjusted under 35 U.S.C. 154(b) by 0 days.

(21) Appl. No.: 18/510,701

(22) Filed: Nov. 16, 2023

(51) Int. Cl.
*G10H 1/00* (2006.01)

(52) U.S. Cl.
CPC ......... *G10H 1/0008* (2013.01); *G10H 1/0066* (2013.01); *G10H 2240/311* (2013.01); *G10H 2250/261* (2013.01)

(58) Field of Classification Search
CPC ............... G10H 1/0008; G10H 1/0066; G10H 2240/311; G10H 2250/261
See application file for complete search history.

(56) References Cited

U.S. PATENT DOCUMENTS

2009/0216354 A1* 8/2009 Ong ..................... G10H 1/0008 700/94
2018/0136350 A1* 5/2018 Dell'Aversana ......... G01V 1/34
2018/0357990 A1* 12/2018 Goren .................. G09B 15/009
2021/0248213 A1 8/2021 Balassanian et al.
2022/0223125 A1 7/2022 Zhou et al.

FOREIGN PATENT DOCUMENTS

CA 3113775 A1 * 4/2020 ........... G10H 1/0025

OTHER PUBLICATIONS

Rachel M. Bittner et al., "A Lightweight Instrument-Agnostic Model for Polyphonic Note Transcription and Multipitch Estimation", 2022 IEEE International Conference on Acoustics, Speech and Signal Processing (ICASSP), May 2022.
"PCT International Search Report" by United States Patent and Trademark Office (US) in Application No. PCT/US23/84502, Filed Dec. 18, 2023, mailed Apr. 15, 2024, 2 pages.
International Claims examined by United States Patent and Trademark Office (US) in Application No. PCT/US23/84502, Filed Dec. 18, 2023, 4 pages.

* cited by examiner

*Primary Examiner* — Jianchun Qin
(74) *Attorney, Agent, or Firm* — ARLUYS IP, P.C.

(57) ABSTRACT

Techniques are described for real-time converting audio into digital musical notation. In an implementation, the process receives a sequence of samples of an audio stream in real time. Based on the sequence of samples, the process generates a window set of note event probability values. The process excludes from the window set of event probability values a leading set of event probability values and a trailing set of event probability values, thereby generating a filtered window set of event probability values. Based on the filtered window set of event probability values, the process determines a sequence set of note-on and note-off events.

18 Claims, 8 Drawing Sheets

REAL-TIME AUDIO TO DIGITAL MUSIC NOTE CONVERSION

FIELD OF THE TECHNOLOGY

The present invention relates to the field of audio processing, in particular to real-time audio-to-digital music note (e.g., MIDI format) conversion.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer systems are extensively used in audio processing. Acquisition of audio, editing, encoding, storage, decoding and reproduction are key functions performed by computers today. The computer tools performing these and other audio processing functions greatly improve the quality of music production and consumption.

While most audio processing capabilities have substantially advanced with the growth in computer-related technologies, the transformative and generative functions of audio processing have stayed limited in scope. Such functions mainly concentrate on improving the quality of existing music recordings or mixing existing sources of music. As such, digital audio processing lacks tools that compose new music or at least aid in the composition of new music.

A major roadblock for computer systems to self-generate music audio is the lack of tools that enable computer systems to perform in-depth analysis of the acquired music audio signal. A musician, when composing music, transcribes the music into the musical notations and iterates over them. It is for that reason that music education includes classes for music ear training, in which the perceived music audio is decomposed into proper music notes. The score sheet of music notes produced by a musician is then used by the music performer(s) to accurately reproduce the music audio on a variety of musical instruments.

However, in some circumstances, the musicians (in fact, many famous ones) may not know the proper transcription of music into musical notes. Such musicians may have to rely on the studio or their staff to transcribe and iterate over their music, which may lead to interruptions in the creative process, thus delaying the production of the music and reducing its quality. But it is even worse for young musicians who may also lack proper musical education. Such young musicians may have musical talent and enjoy composing music (e.g., jamming) but may not have enough funds to invest in personnel to perform this task, significantly reducing their chances for success.

The Musical Instrument Digital Interface (MIDI) format fully describes music audio in music notes, digitalizing the music sheet for a composition. MIDI is a standard of digital music representation in computational systems and describes a communications protocol, digital interface, and electrical connectors that connect a wide variety of electronic musical instruments, computers, and related audio devices for playing, editing, and recording music. MIDI standard includes textual notations representing various events analogous to playing notes of a music sheet.

Accordingly, for computers to be able to generate music, computers need to capture the music audio into MIDI or like format. One approach to capture audio music into MIDI representation is to use specialized hardware devices. Such hardware devices use physical sensors to detect various motions of musical instruments (e.g., vibrations of strings) and, therefore, detect events of particular notes/pitches being played. However, such hardware solutions are expensive and not practical for vocal music and/or multiple instruments.

BRIEF DESCRIPTION OF THE DRAWINGS

In the drawings of certain implementations in which like reference numerals refer to corresponding parts throughout the figures.

DETAILED DESCRIPTION

Figure 1:
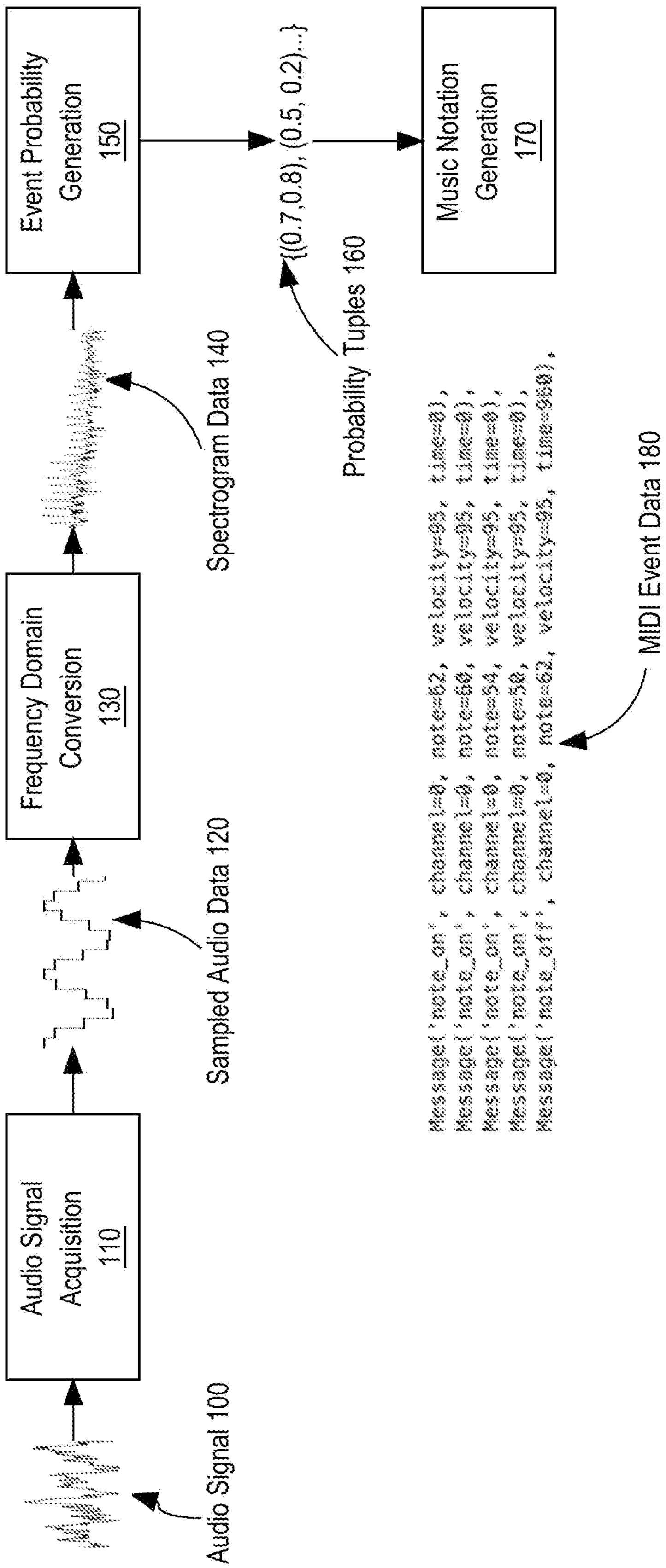
FIG. 1 is a block diagram that depicts a data flow for generating music notation data, in an implementation.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe techniques for real-time converting audio into digital music note representation. Although the examples and implementations herein refer to the Musical Instrument Digital Interface (MIDI) format as the digital music note representation, however, the exact format used to digitally represent music notes is not critical to the techniques described herein.

To accurately represent captured audio data in digital music note representation, a large segment of audio data is processed, in an implementation. The larger the segment, the more accurate the conversion from audio data to its frequency domain and generation of notes based on the frequency-transformed data are. However, the larger the segment, the more lag is introduced, and therefore, an accurate transformation introduces so much lag between the audio signal and resulting digital representation that it can no longer be considered real-time.

However, when the real-time audio signal is processed in smaller portions, referred to herein as "windows", no significant lag is introduced. Although each window may not correspond to enough audio samples to accurately convert to digital music notation, the middle portion of the window, when converted to digital music notation data, is accurate. In an implementation, the next window is selected in such a way that its filtered middle portion is the time continuation of the previous window's filtered middle portion. Accordingly, the real-time audio signal may be processed in overlapping window sets of frames. The term "frame" refers to a sequence of audio samples and transformations thereof. While the current window is being processed, the audio samples for the next or subsequent windows are being collected by real-time acquisition.

In an implementation, a sequence of audio samples of each frame is converted to a corresponding frequency domain frame, generating a window set of frequency domain frames for the window. Each window set of frequency frames is transformed into a corresponding set of music note (simply "note") event probability values. The probability values for the filtered set of frames for each window are converted to note-on and note-off events. The term "note-on event" refers to the event of detecting the playing of a note that was not playing before in the audio signal. The term "note-off event" refers to the event of detecting the finishing of playing of a note that was playing before. Based on the probabilities determined for a frame, the techniques describe determining whether the frame contains a note-on event, a note-off event, or none for each note.

Data Flow Over View

FIG. 1 is a block diagram that depicts a data flow for generating music notation data, in an implementation. At block 110, Audio Signal 100 is acquired in real-time by sampling the signal at a predetermined sampling frequency. After at least a frame of audio samples of Audio Signal 100 is acquired, the frame of sampled audio data 120 is generated at Audio Signal Acquisition block 110. The duration frame may be pre-configured to be at least the minimum duration that is necessary to acquire enough audio samples for capturing the frequency spectrum of an audio signal. A non-limiting example may be a frame of 256 samples of Audio Signal 100 acquired at the 44.1 KHz sampling/frequency, yielding 0.0058 seconds for each frame duration. Each generated frame of Audio Signal Acquisition block 110 may contain a sequence of amplitude values for the acquired Audio Signal 100 as part of Sampled Audio Data 120.

At Frequency Domain Conversion block 130, the process performs frequency domain transformation for each frame of Sampled Audio Data 120, thereby generating Spectrogram Data 140 for each frame. The transformation converts the sequence of sampled audio data of a frame in the time domain to frequency component values in the frequency domain, yielding Spectrogram Data 120. Frequency Domain Conversion block 130 may use any frequency conversion methodology, including, but not limited to, constant-q transform (CQT).

In an implementation, when a certain number of frames of spectrograms are generated, this time-series set of spectrograms is selected to generate music note event probabilities at block 150. The term "window set" refers to such a time-series set in which members of the set are associated with the duration of the window. The size of the window may be configurable using the number of members or the time duration itself. For example, the size of a window set of frames of spectrograms may be configured to contain 100 frames.

Because the subsequent processing of audio-based data occurs on a per-window basis, the window size determines at least in part the lag of real-time audio processing. The greater the window size, the longer it takes for the next set of music notes to be generated. Accordingly, by keeping the window size under several seconds (e.g., 2 seconds), real-time conversion of audio-to-digital notes is performed.

Event Probability Generation

Event Probability Generation block 150 receives as input a window set of frames of spectrograms as Spectrogram Data 140 and uses one or more statistical/predictive algorithms to determine event probabilities for each music note in each frame of the window, in an implementation. The event probabilities may be arranged as frames of Probability Tuples 160. Probability Tuples 160 may contain different probabilities, such as a note-started probability, indicating the probability of the playing of the corresponding note being initiated in the corresponding frame (transitioning to a note-on state) and/or a note-on probability, indicating the probability of the corresponding note is being played in the corresponding frame (in a note-on state). Accordingly, Event Probability Generation block 150 generates an output window set of frames corresponding to the input window set of frames, each frame of the output window set of frames including a tuple of probability values for each note.

In an implementation, to generate probability tuples, Event Probability Generation block 150 includes machine learning model(s), which were generated by training the corresponding machine learning algorithm(s) using training data sets of known notes for spectrogram data. For example, one or more convolution neural network (CNN) models are used in Event Probability Generation block 150 to generate music note event probabilities. Such a CNN may include one or more convolutional layers, pooling layers, and/or fully connected layers. A convolutional layer performs a convolution using a kernel, whose dimensions may be hyper-parameters and whose weights are the model artifacts of the CNN. The convolution is performed by sliding the kernel over the input tensor of Spectrum Data 140 and computing the dot product between its weights and the covered region of the input tensor.

The selection of hyper-parameter values for CNN and other machine learning techniques is described in the sections "MACHINE LEARNING ALGORITHMS AND DOMAINS" and "HYPER-PARAMETERS, CROSS-VALIDATION AND ALGORITHM SELECTION." The CNN of Event Probability Generation block 150 may be trained according to techniques described in the "TRAINING MACHINE LEARNING MODEL" in one or more implementations.

In an implementation, the initial input tensor of the CNN model is arranged so that each frame of the Spectrogram Data 140 in the window is a column in the initial input tensor, while the rows correspond to frequency values. The frequency values in the tensor may be normalized for the CNN to perform the processing more efficiently.

The output of Event Probability Generation block 150 may be a window set of frames of Probability Tuples 160. For each input frame in a window set of Spectrogram Data 140, block 150 generates a corresponding output frame in Probability Tuples 160. In the output frame, the probability tuples are arranged so each probability tuple corresponds to a particular music note and indicates the probability value for that note to be playing in the received Audio Signal 100 at the time corresponding to the frame.

Figure 2:
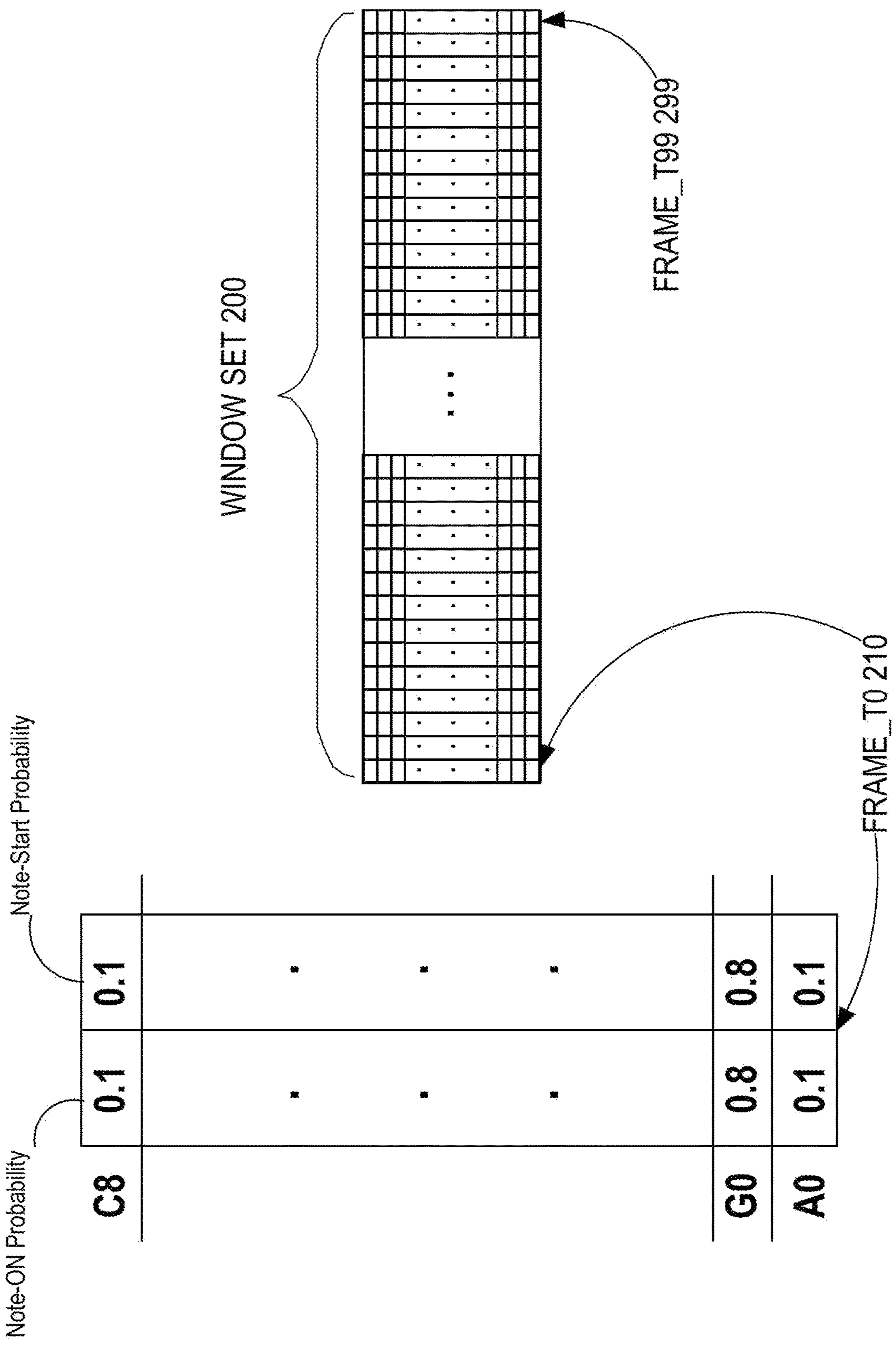
FIG. 2 is a block diagram that depicts an example for a frame of probability tuples and its window set, in an implementation.

FIG. 2 is a block diagram that depicts an example for a frame of probability tuples and its window set, in an implementation. FRAME_T0 210 is the frame that corresponds to the T0 time duration. Based at least on the spectrogram data for the corresponding frame at T0, Event Probability Generation block 150 has generated probability tuples of FRAME_T0 210. FRAME_T0 210 contains probability tuples for various music notes (A0, G0 . . . C8). FRAME_T0 210 may contain probability tuple values for all possible notes of a plano or any other musical instrument. Each example probability tuple contains notes-ON probability, indicating whether the corresponding note was playing at time duration T0 and note-start probability value, indicating whether the corresponding note started playing at time duration T0. FRAME_T0 210 indicates that there is a high probability of the G0 note being started and playing during frame time duration T0.

Although only FRAME_T0 is depicted in FIG. 2, window set 200 contains frames for other consecutive time durations (T0-T99) of the example window. Accordingly, Window set 200 contains the set of probability tuples for music notes arranged from FRAME_T0 210 to FRAME_T99 299 at T99 time duration.

Generating Music Notation

Continuing with FIG. 1, using a window set of frames of Probability Tuples 160, Music Notation Generation block 170 generates events (if any) for each music note for each frame, in an implementation.

Figure 3:
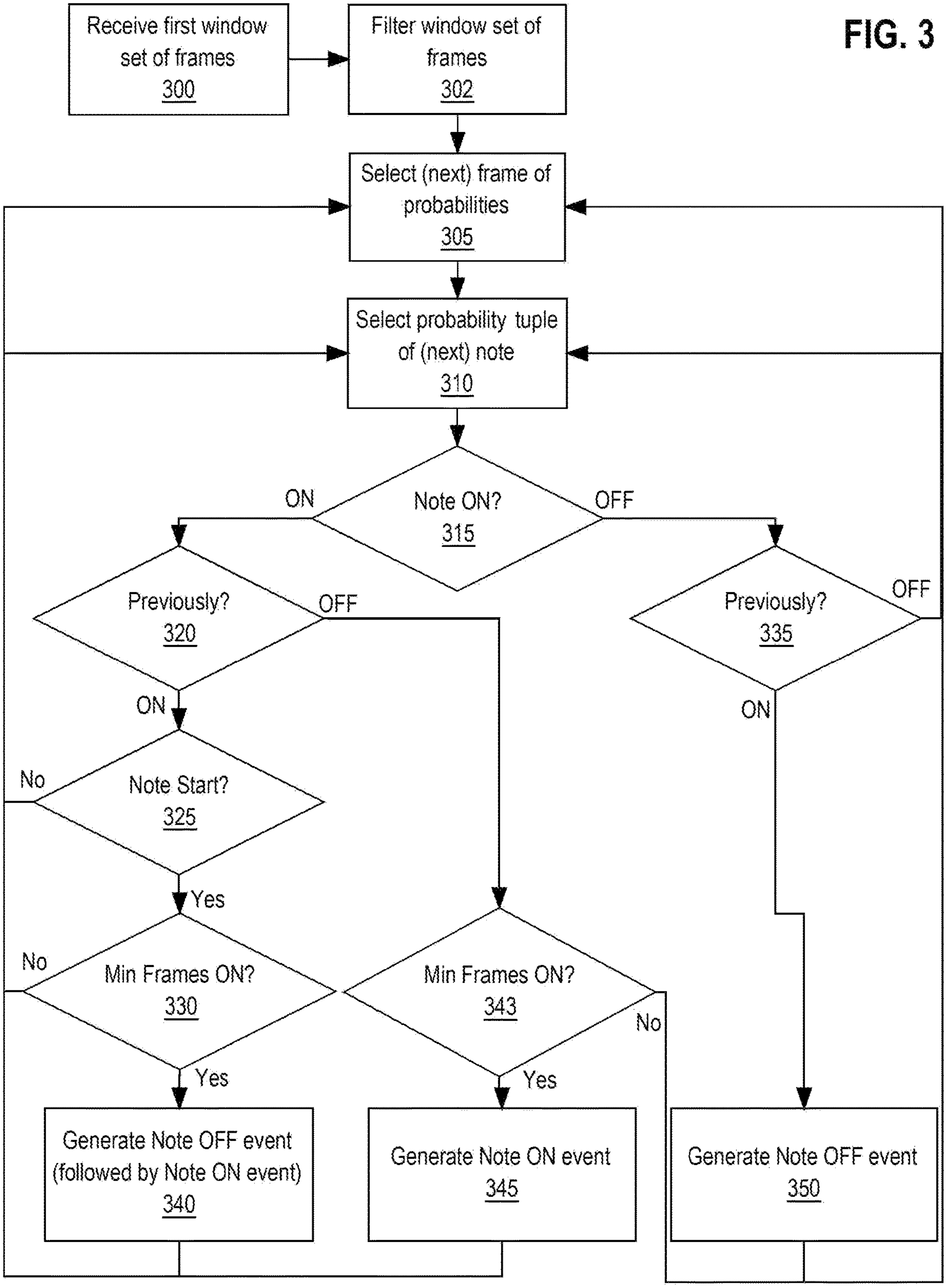
FIG. 3 is a block diagram that depicts the process for generating music note events, in an implementation.

FIG. 3 is a block diagram that depicts the process for generating music note events, in an implementation. At step 300, the process receives the first window set of frames that contain the probability tuples for the notes. The process may start the processing of the first window set of frames as soon as the probability tuples of the first window set are generated and while subsequent frames (for the next window set(s)) of the audio signal are still being real-time sampled. Because this is the first window set for the real-time captured audio signal, no music note has been played yet, and thus, the process initializes the set of previously played music notes to none.

At step 302, the process filters the window set from inaccurately generated probability tuples in edge frame(s), in an implementation. Event Probability Generation block 150 may introduce inaccuracy in the frames that have less information about their neighboring frames. Such frames are referred to herein as "edge frames". At step 302, the edge frames are filtered out from the window set of frames of probability tuples to generate a filtered window set.

For example, when CNN models are used for Event Probability Generation block 150, each convolution introduces inaccuracies that depend on the width of the kernel (the dimension corresponding to that of the frames in the input window set) used in the convolution operation. For example, in the CNN model that uses convolution with the kernel of width 5 followed by the kernel of width 3, then width 5, then width 7, then width 7, then width 7, and then width 3, the number of inaccurate frames may be determined by: $(5-1)+(3-1)+(5-1)+(7-1)+(7-1)+(7-1)+(3-1)=30$ frames. Accordingly, for such an example CNN, the edge frames would be configured to be 15 leading edge frames and 15 trailing edge frames.

Figure 4:
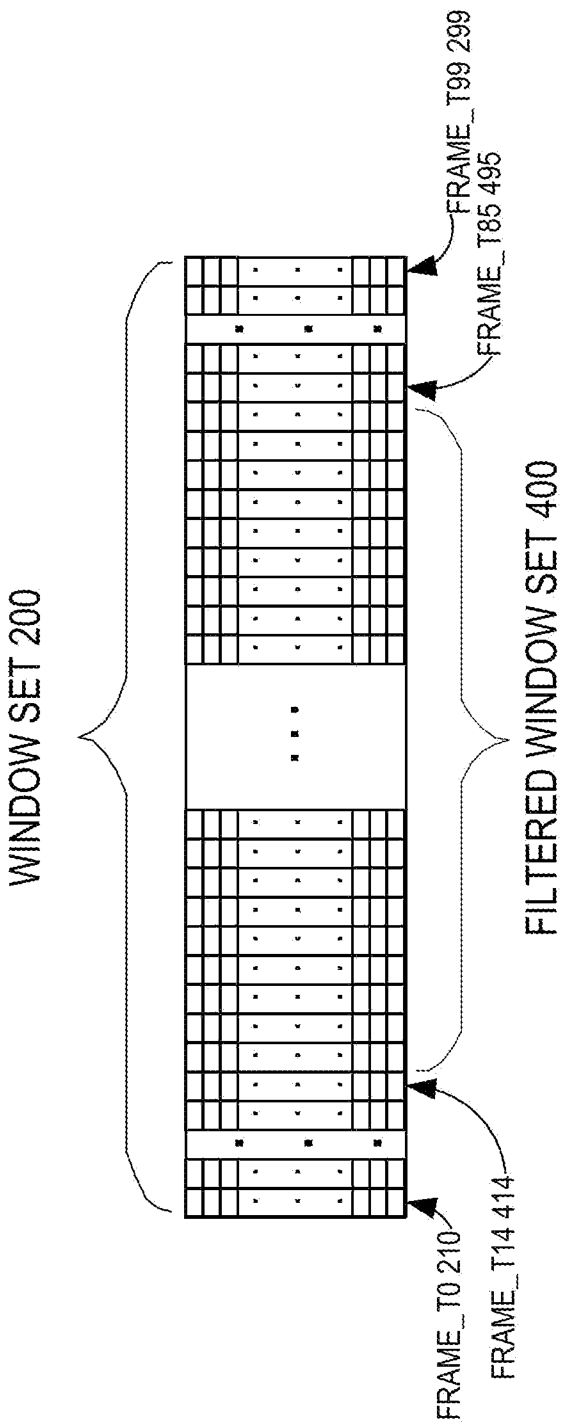
FIG. 4 is an example of a filtered window set.

FIG. 4 is an example of a filtered window set. In FIG. 4, the process filters Window Set 200 of FIG. 2 to exclude the trailing and leading edge frames for the example CNN above. Accordingly, FRAME_T0 210 to FRAME_T14 414 are identified as the 15 leading edges of Window Set 200, and FRAME_T85 495 to FRAME_T99 299 are identified as the trailing edges of Window Set 200. The filtering out of these frames yields Filtered Window Set 400.

Continuing with FIG. 3, the process iterates through each note's probability tuple in each frame to determine whether any note event has occurred. At step 305, a frame is selected from the filtered window set of frames, and at step 310, a probability tuple for a music note in the selected frame is selected.

At step 315, the process evaluates whether the selected note meets the criteria for the note being ON (in a note-on state). In an implementation, the process selects the note-on probability from the selected probability tuple, indicating the probability of the selected music note being played and compares the probability value with a pre-configured threshold. If the probability value is above the pre-configured threshold for note-on, then the process determines that the selected music note is currently being played, i.e., is in a note-on state. If the probability value is below the pre-configured threshold for note-on, the process determines that the selected music note is not currently being played, i.e., in a note-off state.

In other implementations, the probability value for the selected note is determined by the selected frame's probability value and, additionally, neighboring one or more frames' probability values. The multiple probability values may be aggregated using one or more aggregation function(s), such as the weighted average, in which the closer in time frames' probability values are assigned a higher weight than further in time frames' probability values. Additionally or alternatively, other notes' probability values for the same or different frame may be used. The probability values may be aggregated using one or more aggregation functions, such as weighted average, in which more similar notes' probability values are assigned a higher weight than less similar notes' probability values.

Additionally or alternatively, the pre-configured threshold may be configured based on the type of audio source. In particular, different musical instruments and vocal sources may be assigned different thresholds for different music notes. In such an implementation, to determine whether the note-on criteria is met, the process may obtain the type of audio for the window set and the corresponding threshold for the type of audio and/or for the particular selected note.

Continuing with FIG. 2, if the process determines that the selected note for the selected frame has met the note-on criteria, the process proceeds to step 320. At step 320, the process identifies the previously determined note-on state for the selected note. The process maintains a set of music notes that were in the note-on state in the previous iteration. The term "previously note-on set" refers to such a set of notes and may change at each iteration of frame/note.

For the first frame of the first filtered window set, the previously note-on set is empty, as it may be assumed that no music was played prior to the first frame in the first filtered window set. Otherwise, the previously note-on set contains the notes that are played in the previous frame as determined using the techniques described herein.

If, at step 320, the process identifies that the selected music note for the selected frame was previously OFF, the process determines that the state of the music note has changed from note-off to note-on.

In one implementation, the process determines whether the note has been in the note-on state for the minimum number of frames at step 343. To avoid short durations of note-on state, in such an implementation, the process retrieves the minimum frame note-on threshold. The process retrieves the same number (or one less) of future frames for the selected note. If the future notes satisfy the note-on criteria as described herein, the process generates a note-on event and stores it in MIDI format at step 345. The process also adds the selected note to the previously note-on set and/or increments the counter of the frames the selected music note is in the note-on state.

The pre-configured threshold for the minimum number of frames in note-on state may be configured based on the type of audio source. In particular, different musical instruments and vocal sources may be assigned different thresholds for different music notes. In such an implementation, to determine whether the note-start criteria is met, the process may obtain the type of audio for the window set and the corresponding threshold for the type of audio and/or for the particular selected note.

Otherwise, if at step 343, the minimum note-on state threshold is not met, the process skips generating a note-on event and proceeds to select the next note/frame at steps 305 and/or 310, in such implementation.

On the other hand, the selected note may have been playing, i.e., in the note-on state, in the frame(s) before. Accordingly, if, at step 320, the process identifies that the selected note is in the previously note-on set, then the process proceeds to step 325. At step 325, the process determines whether it is a new start of the same note or a continuation of the same note-on state. The process at step 325 evaluates whether the note-start probability of the selected probability tuple meets the note-start criteria.

In an implementation, the process selects the note-start probability from the selected probability tuple, indicating the probability of the selected music note being (re-)started in the selected frame. The process compares the note-start probability value with a pre-configured threshold for the note-start. If the probability value is above the pre-configured threshold for note-start, then the process proceeds to step 330 and determines that the selected music note is being replayed in the current state. The state of the selected note should be in the note-off state and then turn back to the note-on state.

If the probability value is below the pre-configured threshold for note-start, the process determines that the selected music note is continuously played, i.e., the state of the selected note continues to be note-on. Thus, at step 325, the note-start criteria is not met, and no event is generated as the note is already in the note-on state. The process may increment the frame count of note-on states for the selected note.

In other implementations, the note-start probability value for the selected note is determined by the selected frame's probability value and, additionally, neighboring one or more frames' probability values. The multiple probability values may be aggregated using one or more aggregation function(s), such as the weighted average, in which the closer in time frames' probability values are assigned a higher weight than further in time frames' probability values. Additionally or alternatively, other notes' probability values for the same or different time frame may be used. The probability values may be aggregated using one or more aggregation functions, such as weighted average, in which more similar notes' probability values are assigned a higher weight than less similar notes' probability values.

Additionally or alternatively, the pre-configured threshold for the note-start may be configured based on the type of audio source. In particular, different musical instruments and vocal sources may be assigned different thresholds for different music notes. In such an implementation, to determine whether the note-start criteria is met, the process may obtain the type of audio for the window set and the corresponding threshold for the type of audio and/or for the particular selected note.

Continuing with FIG. 3, when the process determines that the selected note in the selected frame has been replayed, the process proceeds to step 330. At step 330, the process determines whether the note has been in the note-on state for the minimum number of frames, in an implementation. To avoid short durations of a note-on state before changing to the note-off state, in such an implementation, the process tracks the number of frames that the note(s) of the previously note-on set have been in the note-on state. At step 340, the process retrieves the minimum note-on state threshold and compares it to the obtained count for the selected note. If the frame count is below the threshold, no new event is necessary to generate. And since the note continues to be in the note-on state, the count of note-on state frames may be incremented for the note.

Otherwise, if the count is above the minimum note-on state threshold, the process at step 340 generates a note-off event. The note is removed from the previously note-on set, and/or the frame count of the continuous note-on state is reset for the note. Additionally, the process may further generate a note-on event and/or may wait for the process to determine whether there is a likely note-on event in the next frame. The process may store the generated event data in the MIDI format.

At step 315, the note-on criteria may alternatively fail to meet the note-on criteria for the selected note of the selected frame. Accordingly, the process determines that the selected note is in the note-off state for the selected frame. The process proceeds to step 335 and evaluates whether the selected note was previously in the same note-off state or not. If the note is not in the previously note-on set, no event is necessary as the selected note continues to stay in the note-off state. Otherwise, at step 350, the process generates a note-off event for the selected note and stores the event in the MIDI format.

The process may iterate through the steps of FIG. 2 for every note in the selected frame and every frame of the filtered window set.

Processing Subsequent Window Sets

Figure 5:
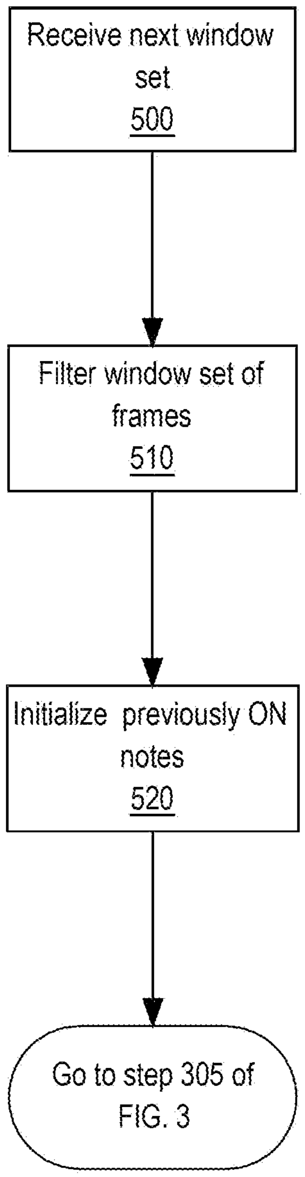
FIG. 5 is a block diagram that depicts the process for determining digital music note representation of the next window set, in an implementation.

FIG. 5 is a block diagram that depicts the process for determining digital music note representation of the next window set, in an implementation.

At step 500, the process receives the next window set of frames of probability tuples. At the same time, subsequent frames of audio signal are being real-time sampled to generate the next window set(s). In an implementation, the next frames of probability tuples overlap with the frames of the previously processed window set. Stated differently, the next window set of frames overlaps with the previous window set of frames in time. As described above, to generate accurate music note events in real-time, a subset of the window set of frames is used, i.e. filtered window set. To have continuous filtered window sets of frames, the frames of the trailing edge of the previous window set overlap with the frames of the next filtered window set, and the frames of the leading edge of the next window set overlap with the frames of the previous filtered window set.

Figure 6:
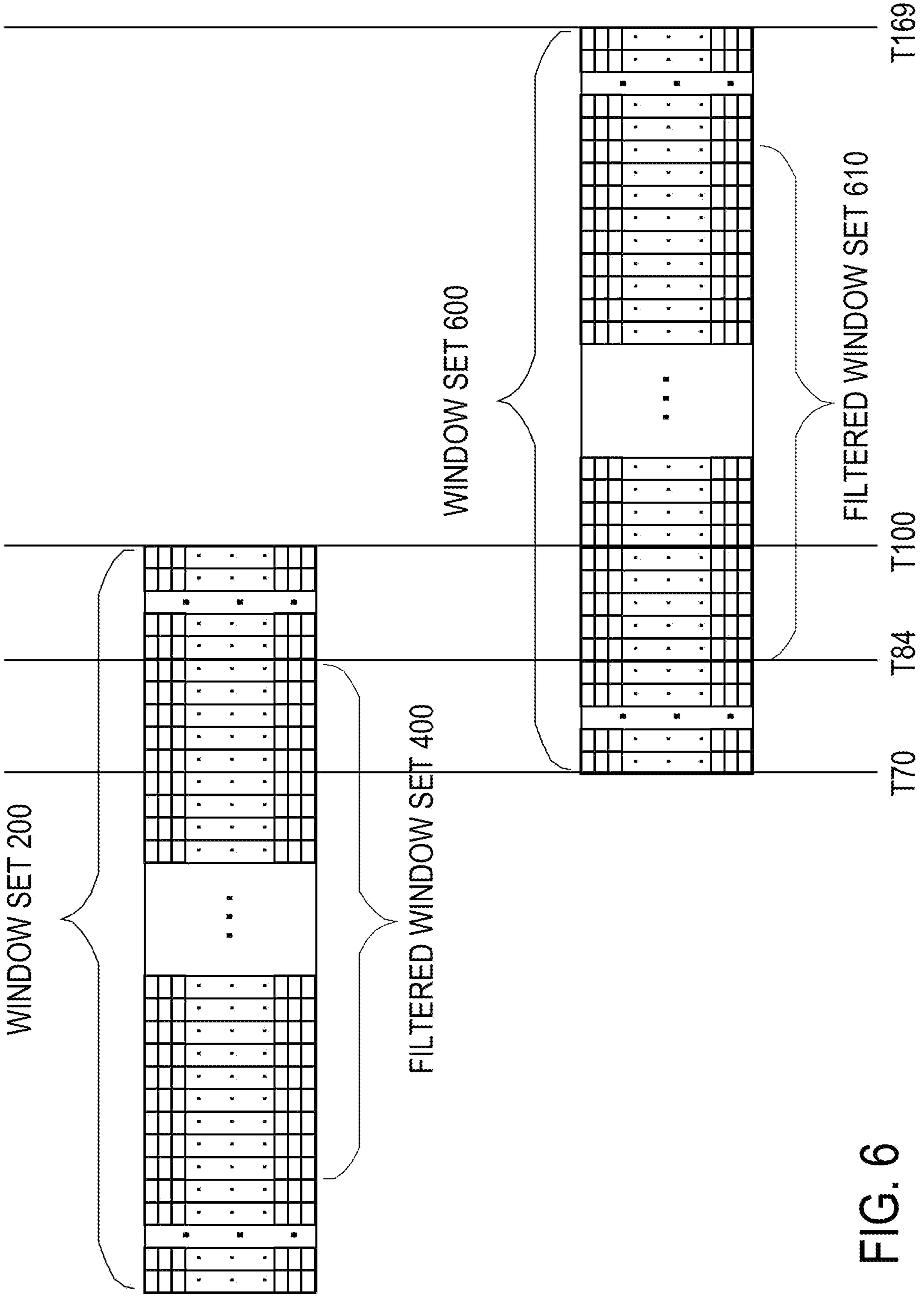
FIG. 6 is a block diagram that depicts examples of sequential window sets.

FIG. 6 is a block diagram that depicts examples of sequential window sets. Window Set 600 is the next window set in time after Window Set 200 (also depicted in FIGS. 2 and 4). Window Set 600 starts from the frame corresponding to time duration T70 rather than T100 (the frame after the last frame of previous Window Set 200). By selecting already processed frames T70 to T99 for next Window Set 600, the process ensures that Filtered Window Set 400 of previous Window Set 200 is immediately followed by next Filtered Window Set 610 of next Window Set 600. Such selection of the next window set also reduces the time lag in real-time processing from 100 frames to 70 frames, the size of the filtered window sets.

Continuing with FIG. 5, at step 510, the frames of the next window set of frames of probability tuples are filtered using techniques described in step 302 of FIG. 2.

At step 520, the process determines the notes that are in the note-on state after the previous filtered window set has been processed. In one implementation, the previously note-on set, as updated by the last iteration of the previous filtered window set, is initialized as the previously-ON set for the first frame of the next filtered window set.

After determining the previously note-on set for the first frame of the next filtered window set, the process transitions to step 305 of FIG. 3 and performs event detection and generation for each note of each frame in the next filtered window set.

Storing Generated Music Notation

At the end of processing each filtered window set, a set of events is detected for the frames of the filtered window set. The corresponding event data is stored in MIDI format for the media. Continuing with FIG. 1, MIDI event data 180 is generated by time stamping each generated event with the time stamp corresponding to the respective frame for which the event was generated. The timestamp may be calculated based on the frame number and the configured frame time duration. The timestamp may use the timestamp of the start of the frame, end of the frame or any other timestamp that corresponds to the duration of the frame.

Training Machine Learning Model

Machine learning techniques include applying a machine learning algorithm on a training data set, for which outcome(s) are known, with initialized parameters whose values are modified in each training iteration to more accurately yield the known outcome(s) (referred herein as "label(s)"). Based on such application(s), the techniques generate a machine learning model with known parameters. Thus, a machine learning model includes a model data representation or model artifact. A model artifact comprises parameter values, which are applied by a machine learning algorithm to the input to generate a predicted output. Training a machine learning model entails determining the parameter values of the model artifact. The structure and organization of the parameter values depend on the machine learning algorithm.

Accordingly, the term "machine learning algorithm" (or simply "algorithm") refers herein to a process or set of rules to be followed in calculations in which a model artifact, comprising one or more parameters for the calculations, is unknown. The term "machine learning model" (or simply "model") refers herein to the process or set of rules to be followed in the calculations in which the model artifact, comprising one or more parameters, is known and has been derived based on the training of the respective machine learning algorithm using one or more training data sets. Once trained, the input is applied to the machine learning model to make a prediction, which may also be referred to herein as a predicted outcome or output.

In supervised training, training data is used by a supervised training algorithm to train a machine learning model. The training data includes input and "known" output, label. In an implementation, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the parameter values of the model artifact are adjusted. The iterations may be repeated until the desired accuracy is achieved or some other criteria are met.

In an implementation, to iteratively train an algorithm to generate a trained model, a training data set may be arranged such that each row of the data set is input to a machine learning algorithm and further stores the corresponding actual outcome, label value, for the row. For example, each row of the adult income data set represents a particular adult for whom the outcome is known, such as whether the adult has a gross income over $500,000. Each column of the adult training dataset contains numerical representations of a particular adult characteristic (e.g., whether an adult has a college degree, age of an adult . . . ) based on which the algorithm, when trained, can accurately predict whether any adult (even one who has not been described by the training data set) has a gross income over $500,000.

The row values of a training data set may be provided as inputs to a machine learning algorithm and may be modified based on one or more parameters of the algorithm to yield a predicted outcome. The predicted outcome for a row is compared with the label value, and based on the difference, an error value is calculated. One or more error values for the batch of rows are used in a statistical aggregate function to calculate an error value for the batch. The "loss" term refers to an error value for a batch of rows.

At each training iteration, based on one or more predicted values, the corresponding loss values for the iteration are calculated. For the next training iteration, one or more parameters are modified to reduce the loss based on the current loss. Any number of iterations on a training data set may be performed to reduce the loss. The training iterations using a training data set may be stopped when the change in the losses between the iterations is within a threshold. In other words, the iterations are stopped when the loss for different iterations is substantially the same.

After the training iterations, the generated machine learning model includes the machine learning algorithm with the model artifact that yielded the smallest loss.

For example, the above-mentioned adult income data set may be iterated using the Support Vector Machines (SVM) algorithm to train an SVM-based model for the adult income data set. Each row of the adult data set is provided as an input to the SVM algorithm, and the result, the predicted outcome, of the SVM algorithm is compared to the actual outcome for the row to determine the loss. Based on the loss, the parameters of the SMV are modified. The next row is provided to the SVM algorithm with the modified parameters to yield the next row's predicted outcome. The process may be repeated until the difference in loss values of the previous iteration and the current iteration is below a pre-defined threshold or, in some implementations, until the difference between the smallest loss value achieved and the current iteration's loss is below a pre-defined threshold.

Once the machine learning model for the machine learning algorithm is determined, a new data set for which an outcome is unknown may be used as input to the model to calculate the predicted outcome(s) for the new data set.

In a software implementation, when a machine learning model is referred to as receiving an input, executing, and/or generating output or prediction, a computer system process executing a machine learning algorithm applies the model artifact against the input to generate predicted output. A computer system process executes a machine learning algorithm by executing software configured to cause the execution of the algorithm.

Machine Learning Algorithms and Domains

A machine learning algorithm may be selected based on the domain of the problem and the intended type of outcome required by the problem. The non-limiting examples of algorithm outcome types may be discrete values for problems in the classification domain, continuous values for problems in the regression domain, or anomaly detection problems in the clustering domain.

However, even for a particular domain, there are many algorithms to choose from for selecting the most accurate algorithm to solve a given problem. As non-limiting examples, in a classification domain, Support Vector Machines (SVM), Random Forests (RF), Decision Trees (DT), Bayesian networks (BN), stochastic algorithms such as genetic algorithms (GA), or connectionist topologies such as artificial neural networks (ANN) may be used.

Implementations of machine learning may rely on matrices, symbolic models, and hierarchical and/or associative data structures. Parameterized (i.e., configurable) implementations of best-of-breed machine learning algorithms may be found in open-source libraries such as Google's TensorFlow for Python and C++ or Georgia Institute of Technology's MLPack for C++. Shogun is an open-source C++ ML library with adapters for several programming languages, including C #, Ruby, Lua, Java, MatLab, R, and Python.

Hyper-Parameters, Cross-Validation and Algorithm Selection

A type of machine algorithm may have unlimited variants based on one or more hyper-parameters. The term "hyper-parameter" refers to a parameter in a model artifact that is set before the training of the machine algorithm model and is not modified during the training of the model. In other words, a hyper-parameter is a constant value that affects (or controls) the generated trained model independent of the training data set. A machine learning model with a model artifact that has only hyper-parameter values set is referred to herein as a "variant of a machine learning algorithm" or simply "variant." Accordingly, different hyperparameter values for the same type of machine learning algorithm may yield significantly different loss values on the same training data set during the training of a model.

For example, the SVM machine learning algorithm includes two hyperparameters: "C" and "gamma." The "C" hyper-parameter may be set to any value from $10^{-3}$ to $10^{5}$, while the "gamma" hyper-parameter may be set from $10^{-5}$ to $10^{3}$. Accordingly, there are endless permutations of the "C" and "gamma" parameters that may yield different loss values for training the same adult income training data set.

Therefore, to select a type of algorithm or, moreover, to select the best-performing variant of an algorithm, various hyper-parameter selection techniques are used to generate distinct sets of hyper-parameter values. Non-limiting examples of hyper-parameter value selection techniques include a Bayesian optimization such as a Gaussian process for hyper-parameter value selection, a random search, a gradient-based search, a grid search, hand-tuning techniques, a tree-structured Parzen Estimators (TPE) based technique.

With distinct sets of hyper-parameters values selected based on one or more of these techniques, each machine learning algorithm variant is trained on a training data set. A test data set is used as an input to the trained model for calculating the predicted result values. The predicted result values are compared with the corresponding label values to determine the performance score. The performance score may be computed based on calculating the error rate of predicted results in relation to the corresponding labels. For example, in a categorical domain, if out of 10,000 inputs to the model, only 9,000 matched the labels for the inputs, then the performance score is computed to be 90%. In non-categorical domains, the performance score may be further based on a statistical aggregation of the difference between the label value and the predicted result value.

The term "trial" refers herein to the training of a machine learning algorithm using a distinct set of hyper-parameter values and testing the machine learning algorithm using at least one test data set. In an implementation, cross-validation techniques, such as k-fold cross-validation, are used to create many pairs of training and test datasets from an original training data set. Each pair of data sets together contains the original training data set, but the pairs partition the original data set in different ways between a training data set and a test data set. For each pair of data sets, the training data set is used to train a model based on the selected set of hyperparameters, and the corresponding test data set is used for calculating the predicted result values with the trained model. Based on inputting the test data set to the trained machine learning model, the performance score for the pair (or fold) is calculated. If there is more than one pair (i.e., fold), then the performance scores are statistically aggregated (e.g., average, mean, min, max) to yield a final performance score for the variant of the machine learning algorithm.

Each trial is computationally very expensive, as it includes multiple training iterations for a variant of the machine algorithm to generate the performance score for one distinct set of hyper-parameter values of the machine learning algorithm. Accordingly, reducing the number of trials can dramatically reduce the necessary computational resources (e.g., processor time and cycles) for tuning.

Furthermore, since the performance scores are generated to select the most accurate algorithm variant, the more precise the performing score itself is, the more precise the generated model's prediction relative accuracy is compared to other variants. Indeed, once the machine learning algorithm and its hyper-parameter value-based variant are selected, a machine model is trained by applying the algorithm variant to the full training data set using the techniques discussed above. This generated machine learning model is expected to predict the outcome with more accuracy than the machine learning models of any other variant of the algorithm.

The precision of the performance score itself depends on how much computational resources are spent on tuning hyper-parameters for an algorithm. Computational resources can be wasted on testing sets of hyper-parameter values that cannot yield the desired accuracy of the eventual model.

Similarly, less (or no) computational resources may be spent on tuning those hyper-parameters for a type of algorithm that is most likely to be less accurate than another type of algorithm. Accordingly, the number of trials may be reduced or eliminated for hyper-parameters of discounted algorithms, thus substantially increasing the performance of the computer system.

Software Overview

Figure 7:
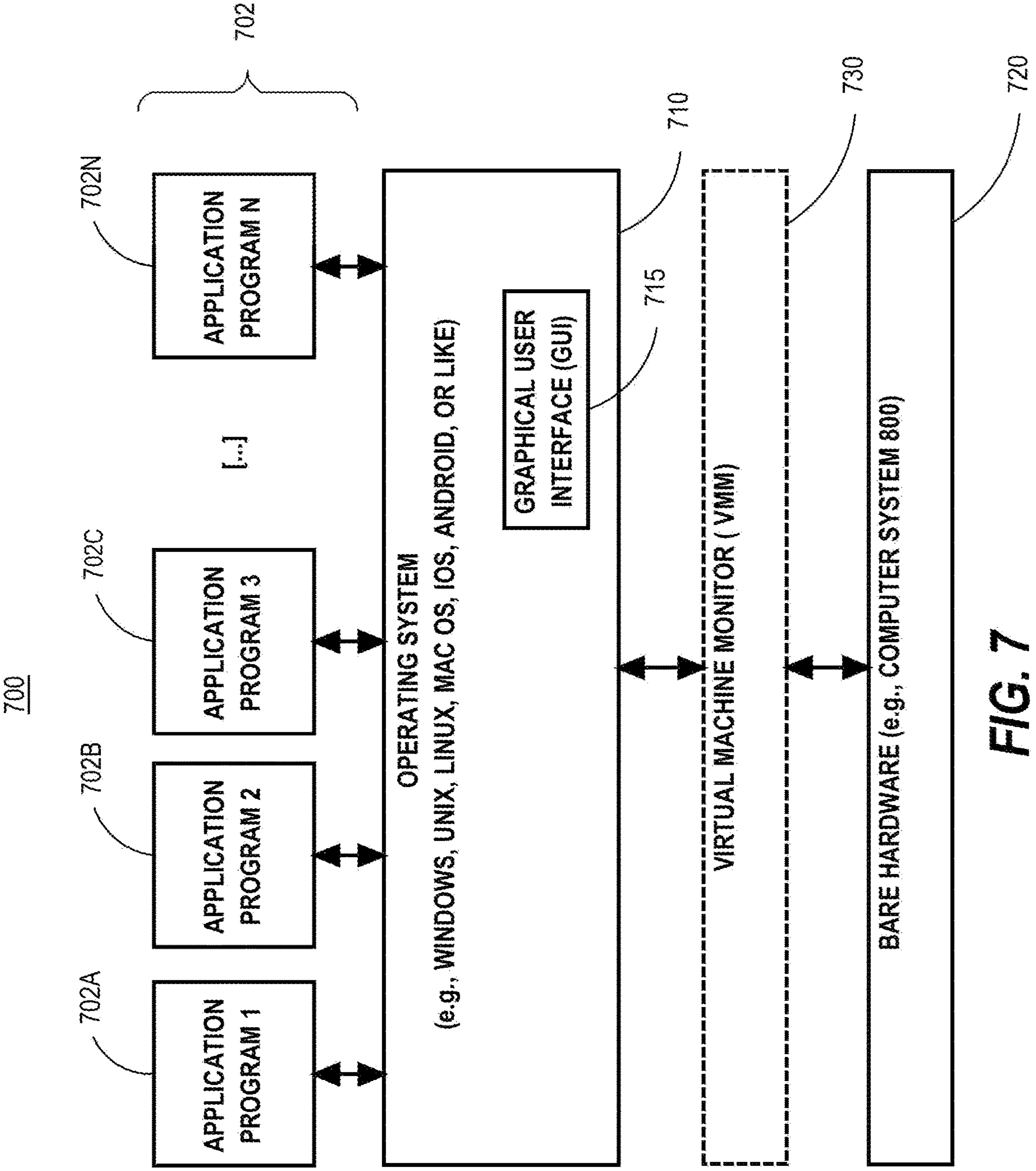
FIG. 7 is a block diagram of a basic software system, in one or more implementations.
Figure 8:
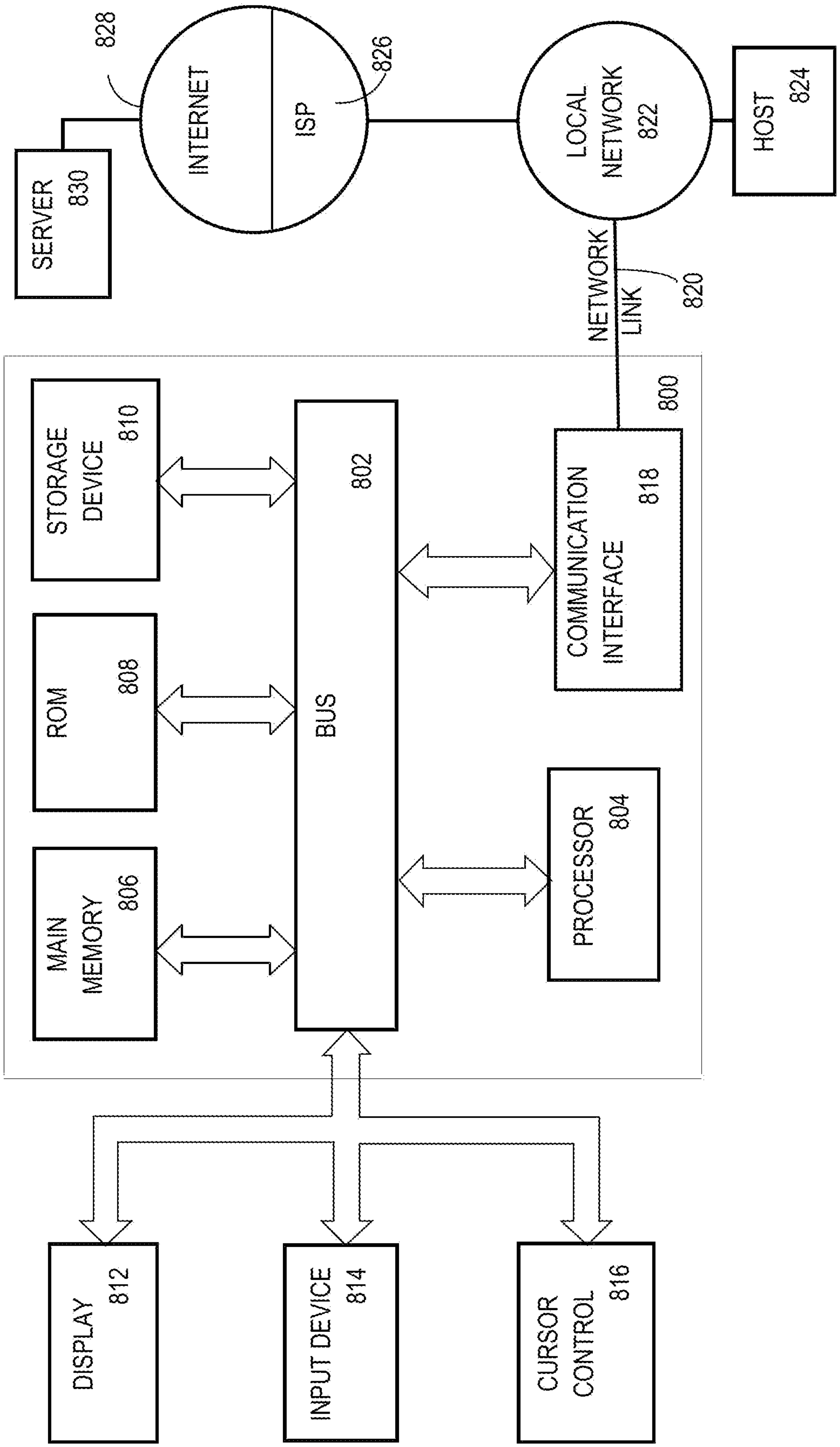
FIG. 8 is a block diagram that illustrates a computer system upon which an implementation of the invention may be implemented.

FIG. 7 is a block diagram of a basic software system 700 that may be employed for controlling the operation of computing system 800 of FIG. 8. Software system 700 and its components, including their connections, relationships, and functions, are meant to be exemplary only, and not meant to limit implementations of the example implementation(s). Other software systems suitable for implementing the example implementation(s) may have different components, including components with different connections, relationships, and functions.

Software system 700 is provided for directing the operation of computing system 800. Software system 700, which may be stored in system memory (RAM) 806 and on fixed storage (e.g., hard disk or flash memory) 810, includes a kernel or operating system (OS) 710.

The OS 710 manages low-level aspects of computer operation, including managing execution of processes, memory allocation, file input and output (I/O), and device I/O. One or more application programs represented as 702A, 702B, 702C . . . 702N, may be "loaded" (e.g., transferred from fixed storage 810 into memory 806) for execution by the system 700. The applications or other software intended for use on computer system 800 may also be stored as a set of downloadable computer-executable instructions, for example, for downloading and installation from an Internet location (e.g., a Web server, an app store, or another online service).

Software system 700 includes a graphical user interface (GUI) 715, for receiving user commands and data in a graphical (e.g., "point-and-click" or "touch gesture") fashion. These inputs, in turn, may be acted upon by system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 804) of computer system 800. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 800.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 800 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but shares access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model that enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment are presented for the purpose of illustrating the basic underlying computer components that may be employed for implementing the example implementation(s). The example implementation(s), however, are not necessarily limited to any particular computing environment or computing device configuration. Instead, the example implementation(s) may be implemented in any type of system architecture or processing environment that one skilled in the art, in light of this disclosure, would understand as capable of supporting the features and functions of the example implementation(s) presented herein.

Hardware Overview

According to one implementation, the techniques described herein are implemented by one or more special-purpose computing devices. The special-purpose computing devices may be hard-wired to perform the techniques or may include digital electronic devices such as one or more application-specific integrated circuits (ASICs) or field-programmable gate arrays (FPGAs) that are persistently programmed to perform the techniques or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an implementation of the invention may be implemented. Computer system 800 includes a bus 802 or other communication mechanism for communicating information and a hardware processor 804 coupled with bus 802 for processing information. Hardware processor 804 may be, for example, a general-purpose microprocessor.

Computer system 800 also includes a main memory 806, such as a random access memory (RAM) or another dynamic storage device, coupled to bus 802 for storing information and instructions to be executed by processor 804. Main memory 806 may also be used for storing temporary variables or other intermediate information during the execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read-only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer System 800 may implement the techniques described herein using customized hard-wired logic, one or more ASICs or FPGAs, firmware and/or program logic, which, in combination with the computer system, causes or programs Computer System 800 to be a special-purpose machine. According to one implementation, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative implementations, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 802. Transmission media can also take the form of acoustic or light waves, such as those generated during radio-wave and infrared data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infra-red detector can receive the data carried in the infra-red signal, and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826, in turn, provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, server 830 might transmit a requested code for an application program through Internet 828, ISP 826, local network 822 and communication interface 818.

The received code may be executed by processor 804 as it is received and/or stored in storage device 810 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, one or more hardware processors may have access to its separate exclusive memory that is not accessible to other processors. The one or more hardware processors may be running under the control of the same operating system.

A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple-core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, implementations of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

acquiring an input audio signal in real-time at least by sampling the input audio signal, thereby generating a first sequence of samples of an audio stream;

while generating next samples that are temporally subsequent to the first sequence of samples of the audio stream:

generating, by one or more machine learning (ML) models, a first window set of music note event probability values, based, at least in part, on the first sequence of samples;

excluding, from the first window set of music note event probability values, a first leading set of music note event probability values that corresponds to a first leading edge of samples of the first sequence of samples and a first trailing set of music note event probability values that corresponds to a first trailing edge of samples of the first sequence of samples, thereby generating a first filtered window set of music note event probability values;

wherein the first leading edge of samples of the first sequence of samples includes a number of initial sequence of samples of the first sequence of samples and the first trailing edge of samples of the first sequence of samples includes a number of last sequence of samples of the first sequence of samples;

based, at least in part, on the first filtered window set of music note event probability values, determining a first sequence set of music note events, which, when reproduced, generates an original audio signal.

2. The method of claim 1, further comprising:

for each frame of the first window set of music note event probability values, determining whether a note-on event or a note-off event is detected for a particular music note based at least in part on one or more previous frames of said each frame of the first window set of music note event probability values for the particular music note.

3. The method of claim 1, further comprising:

for a particular frame of the first window set of music note event probability values, determining that note-on event is detected for a particular music note based at least in part on a probability value for note-on having met criteria for a note-on state and the particular music note having a note-off state for a previous frame of the particular frame of the first window set of music note event probability values.

4. The method of claim 3, further comprising for the particular frame of the first window set of music note event probability values, determining that the note-on event is detected for the particular music note based at least in part on probability values for note-on of next one or more frames of the first window set having met the criteria for a note-on state.

5. The method of claim 1, further comprising:

for a particular frame of the first window set of music note event probability values, determining that a note-on event is detected for a particular music note based at least in part on a probability value for note-on having met criteria for a note-on state and the particular music note having a note-off state in a previous frame of the particular frame of the first window set of music note event probability values.

6. The method of claim 1, further comprising:

for a particular frame of the first window set of music note event probability values, determining that note-off event is detected for a particular music note based at least in part on:

a) probability value for note-on having met note-on criteria for a note-on state, b) a probability value for music note started having met note started criteria, and c) a minimum number of previous frames for the particular frame having a note-on state.

7. The method of claim 1, further comprising:

generating a second sequence of samples of the audio stream;

while generating next samples that are temporally subsequent to the second sequence of samples of the audio stream:

generating a second window set of music note event probability values, based, at least in part, on the second sequence of samples and the number of last sequence of samples of the first sequence of samples;

excluding from the second window set of music note event probability values a second leading set of music note event probability values that correspond to samples before the number of the last sequence of samples of the first sequence of samples and a second trailing set of music note event probability values that correspond to a trailing edge of samples of the second sequence of samples, including from the second window set of music note event probability values that correspond to the trailing edge of samples of the first sequence of samples, and thereby generating a second filtered window set of music note event probability values;

based, at least in part, on the second filtered window set of music note event probability values, determining a second sequence set of music note events.

8. The method of claim 1, wherein generating the first window set of music note event probability values, based, at least in part, on the first sequence of samples comprises:

for each frame of samples in the first sequence of samples in a time domain, transform said each frame of samples to a corresponding frame of frequency component values in a frequency domain, thereby generating a first sequence of frames of frequency component values;

based, at least in part, on the first sequence of frames of frequency component values, generating the first window set of music note event probabilities.

9. The method of claim 1, wherein the one or more ML models are calibrated based, at least in part, on one or more of: a number of frames in a window set, a number of samples in a frame, a number of trailing set of samples, or a number of a leading set of samples.

10. The method of claim 1, further comprising:

based, at least in part, on the first filtered window set of music note event probability values, determining one or more music notes that are in a note-on state for a last frame of the first filtered window set;

generating a second filtered window set of music note event probability values, based, at least in part, on a second sequence of samples and the number of last sequence of samples of the first sequence of samples;

based on a first frame of the second filtered window set of event probability, determining that at least one music note, in the one or more music notes that are in note-on state for the last frame of the first filtered window set, is in a note-off state;

based, at least in part, on determining that the at least one music note is in a note-off state, generating a note-off music note event for the at least one music note of the first frame of the second filtered window.

11. A system comprising one or more processors and one or more storage media storing one or more computer programs that include instructions, which, when executed by the one or more processors, cause:

acquiring an input audio signal in real-time at least by sampling the input audio signal, thereby generating a first sequence of samples of an audio stream;

while generating next samples that are temporally subsequent to the first sequence of samples of the audio stream:

generating, by one or more machine learning (ML) models, a first window set of music note event probability values, based, at least in part, on the first sequence of samples;

excluding, from the first window set of music note event probability values, a first leading set of music note event probability values that corresponds to a first leading edge of samples of the first sequence of samples and a first trailing set of music note event probability values that corresponds to a first trailing edge of samples of the first sequence of samples, thereby generating a first filtered window set of music note event probability values;

wherein the first leading edge of samples of the first sequence of samples includes a number of initial sequence of samples of the first sequence of samples and the first trailing edge of samples of the first sequence of samples includes a number of last sequence of samples of the first sequence of samples;

based, at least in part, on the first filtered window set of music note event probability values, determining a first sequence set of music note events, which, when reproduced, generates an original audio signal.

12. The system of claim 11, wherein the one or more programs include instructions, which, when executed by the one or more processors, further cause:

for each frame of the first window set of music note event probability values, determining whether a note-on event or a note-off event is detected for a particular music note based at least in part on one or more previous frames of said each frame of the first window set of music note event probability values for the particular music note.

13. The system of claim 11, wherein the one or more programs include instructions, which, when executed by the one or more processors, further cause:

for a particular frame of the first window set of music note event probability values, determining that note-on event is detected for a particular music note based at least in part on a probability value for note-on having met criteria for a note-on state and the particular music note having a note-off state for a previous frame of the particular frame of the first window set of music note event probability values.

14. The system of claim 11, wherein the one or more programs include instructions, which, when executed by the one or more processors, further cause:

for a particular frame of the first window set of music note event probability values, determining that a note-on event is detected for a particular music note based at least in part on a probability value for note-on having met criteria for a note-on state and the particular music note having a note-off state in a previous frame of the particular frame of the first window set of music note event probability values.

15. The system of claim 11, wherein the one or more programs include instructions, which, when executed by the one or more processors, further cause:

for a particular frame of the first window set of music note event probability values, determining that note-off event is detected for a particular music note based at least in part on:

a) probability value for note-on having met note-on criteria for a note-on state, b) a probability value for music note started having met music note started criteria, and c) a minimum number of previous frames for the particular frame having a note-on state.

16. The system of claim 11, wherein the one or more programs include instructions, which, when executed by the one or more processors, further cause:

generating a second sequence of samples of the audio stream;

while generating next samples that are temporally subsequent to the second sequence of samples of the audio stream:

generating a second window set of music note event probability values, based, at least in part, on the second sequence of samples and the number of last sequence of samples of the first sequence of samples;

excluding from the second window set of music note event probability values a second leading set of note event probability values that correspond to samples before the number of the last sequence of samples of the first sequence of samples and a second trailing set of music note event probability values that correspond to a trailing edge of samples of the second sequence of samples, including from the second window set of music note event probability values that correspond to the trailing edge of samples of the first sequence of samples, and thereby generating a second filtered window set of music note event probability values;

based, at least in part, on the second filtered window set of music note event probability values, determining a second sequence set of music note events.

17. The system of claim 11, wherein the one or more programs include instructions, which, when executed by the one or more processors, further cause:

for each frame of samples in the first sequence of samples in a time domain, transform said each frame of samples to a corresponding frame of frequency component values in a frequency domain, thereby generating a first sequence of frames of frequency component values;

based, at least in part, on the first sequence of frames of frequency component values, generating the first window set of music note event probabilities.

18. The system of claim 11, wherein the one or more programs include instructions, which, when executed by the one or more processors, further cause:

based, at least in part, on the first filtered window set of music note event probability values, determining one or more music notes that are in a note-on state for a last frame of the first filtered window set;

generating a second filtered window set of music note event probability values, based, at least in part, on a second sequence of samples and the number of last sequence of samples of the first sequence of samples;

based on a first frame of the second filtered window set of event probability, determining that at least one music note, in the one or more music notes that are in note-on state for the last frame of the first filtered window set, is in a note-off state;

based, at least in part, on determining that the at least one music note is in a note-off state, generating a note-off note event for the at least one music note of the first frame of the second filtered window.

* * * * *